(12) United States Patent
Lalancette et al.

(10) Patent No.: US 9,677,690 B2
(45) Date of Patent: Jun. 13, 2017

(54) MULTI-PURPOSE ROOF-TOP SUPPORT

(75) Inventors: Daniel Lalancette, Quebec (CA); Alain Michaud, Richelieu (CA); Adrian Paunescu, Brossard (CA); Dominic England, St-Basile-le-Grand (CA); William Smith, Kirkland (CA)

(73) Assignee: THOMAS & BETTS INTERNATIONAL, LLC, Wilmington, DE (US)

( * ) Notice: Subject to any disclaimer, the term of this patent is extended or adjusted under 35 U.S.C. 154(b) by 0 days.

(21) Appl. No.: 12/702,119

(22) Filed: Feb. 8, 2010

(65) Prior Publication Data
US 2011/0192941 A1   Aug. 11, 2011

(51) Int. Cl.
| | | |
|---|---|---|
| F16L 3/20 | (2006.01) | |
| F24F 13/02 | (2006.01) | |
| F16L 3/00 | (2006.01) | |
| F16L 3/04 | (2006.01) | |
| E04D 13/12 | (2006.01) | |
| E04D 11/00 | (2006.01) | |

(52) U.S. Cl.
CPC ...... *F16L 3/00* (2013.01); *F16L 3/04* (2013.01); *F16L 3/20* (2013.01); *F24F 13/0254* (2013.01); *E04D 11/007* (2013.01); *E04D 13/12* (2013.01)

(58) Field of Classification Search
CPC ......... F16L 3/1218; F16L 7/00; F16L 3/1215; F16L 3/1033; F16L 3/04; E04B 9/00; E04B 5/48; E04B 5/43; A61C 13/28; E01D 19/00; E02D 7/00; F24F 13/0254; E04D 13/12; E04D 11/007

USPC ...... 248/49, 65, 70, 346.01, 346.03, 346.05, 248/237; 52/126.4, 126.7, 678, 686, 52/126.6, 126.1, 126.2
See application file for complete search history.

(56) References Cited

U.S. PATENT DOCUMENTS

| | | | | |
|---|---|---|---|---|
| 2,345,976 | A | * | 4/1944 | Hillberg ......................... 52/678 |
| 2,684,222 | A | * | 7/1954 | Miller ...................... F16L 3/00 248/354.3 |
| 3,023,990 | A | * | 3/1962 | Gunthel, Jr. .............. F16L 3/16 174/169 |
| 3,027,140 | A | | 3/1962 | Holzbach |
| 3,398,933 | A | * | 8/1968 | Haroldson ........... A47B 91/022 248/354.3 |
| 4,244,542 | A | | 1/1981 | Mathews |
| 4,306,697 | A | | 12/1981 | Mathews |
| 4,445,656 | A | * | 5/1984 | Leitch et al. ................... 248/49 |
| 4,505,006 | A | | 3/1985 | Andre |
| 4,581,863 | A | | 4/1986 | Thaler |
| 4,870,789 | A | | 10/1989 | Clark et al. |
| 4,996,804 | A | * | 3/1991 | Naka ................. E04F 15/02482 52/126.1 |

(Continued)

FOREIGN PATENT DOCUMENTS

| | | |
|---|---|---|
| CA | 2023045 | 2/1992 |
| CA | 2023332 | 2/1992 |

(Continued)

*Primary Examiner* — Muhammad Ijaz
(74) *Attorney, Agent, or Firm* — Butler Snow LLP (57) ABSTRACT

A multi-purpose universal support is disclosed that can be configured to support multiple pipes, pipe junctions, vertical strut channels, horizontal strut channels, and thread rods. The disclosed support system allows for quicker installation, easy height adjustments, and a fewer supports than previously known supports.

14 Claims, 11 Drawing Sheets

(56) References Cited

U.S. PATENT DOCUMENTS

| | | | |
|---|---|---|---|
| 5,040,753 A | 8/1991 | Roth | |
| 5,107,654 A * | 4/1992 | Leonardis | E04C 5/20 52/677 |
| 5,217,191 A | 6/1993 | Smith | |
| 5,335,887 A | 8/1994 | Torrens et al. | |
| 5,412,914 A * | 5/1995 | Daw | E04B 1/19 52/126.6 |
| 5,564,669 A | 10/1996 | Wu | |
| 5,590,494 A | 1/1997 | Miller | |
| 5,685,508 A | 11/1997 | Smith | |
| 5,816,554 A * | 10/1998 | McCracken | E04F 15/02458 248/346.01 |
| 5,829,718 A | 11/1998 | Smith | |
| 5,906,341 A | 5/1999 | Brown | |
| 5,967,468 A | 10/1999 | Veghte et al. | |
| 5,984,242 A | 11/1999 | Meyer | |
| 6,017,005 A | 1/2000 | Smith | |
| D427,049 S | 6/2000 | Neider et al. | |
| 6,076,778 A | 6/2000 | Brown | |
| 6,106,189 A * | 8/2000 | Seale | 403/398 |
| D433,615 S | 11/2000 | Neider et al. | |
| D435,430 S | 12/2000 | Valentz et al. | |
| 6,206,613 B1 | 3/2001 | Elkins | |
| D447,931 S | 9/2001 | Aitken | |
| 6,324,800 B1 | 12/2001 | Valentz et al. | |
| 6,332,292 B1 | 12/2001 | Buzon | |
| 6,345,474 B1 * | 2/2002 | Triplett | 52/169.9 |
| 6,364,256 B1 | 4/2002 | Neider et al. | |
| 6,427,965 B1 | 8/2002 | McCracken | |
| D463,250 S | 9/2002 | Valentz | |
| 6,443,402 B1 | 9/2002 | Ferrill et al. | |
| 6,502,791 B2 | 1/2003 | Parker | |
| 6,536,717 B2 | 3/2003 | Parker | |
| 6,592,093 B2 | 7/2003 | Valentz | |
| 6,644,601 B2 | 11/2003 | Aussiker | |
| 6,663,070 B2 | 12/2003 | Valentz et al. | |
| 6,682,025 B2 | 1/2004 | Turner et al. | |
| D498,133 S | 11/2004 | Sargent | |
| D500,668 S * | 1/2005 | Kelly | D8/354 |
| 6,863,253 B2 | 3/2005 | Valentz et al. | |
| 6,948,283 B2 | 9/2005 | Burkart et al. | |
| 7,090,174 B2 | 8/2006 | Korczak et al. | |
| 7,172,161 B2 | 2/2007 | Rosemann et al. | |
| 7,386,955 B1 * | 6/2008 | Repasky | E04D 11/005 248/188.4 |
| 7,731,131 B2 * | 6/2010 | Trueb | E04D 13/00 248/49 |
| 7,798,920 B1 * | 9/2010 | Cortes | 473/440 |
| D649,434 S * | 11/2011 | Lalancette | D8/354 |
| 8,256,175 B2 * | 9/2012 | Buzon | 52/263 |
| 8,524,349 B2 * | 9/2013 | Protais | B65D 1/0284 215/373 |
| 2001/0009087 A1 * | 7/2001 | Valentz | E04D 13/12 52/298 |
| 2002/0011548 A1 * | 1/2002 | Parker | F16L 3/1016 248/354.3 |
| 2004/0261329 A1 * | 12/2004 | Kugler et al. | 52/126.6 |
| 2006/0059789 A1 * | 3/2006 | Sargent | F16L 3/137 52/26 |
| 2006/0131469 A1 * | 6/2006 | Roy | F16L 3/02 248/346.03 |
| 2007/0186498 A1 * | 8/2007 | Buzon | E04B 5/12 52/263 |
| 2008/0222973 A1 * | 9/2008 | Lee | E04F 15/02476 52/126.1 |
| 2009/0173018 A1 * | 7/2009 | Buzon | E04F 15/0247 52/126.6 |
| 2009/0199494 A1 * | 8/2009 | Lee | B25B 13/485 52/126.6 |
| 2010/0038516 A1 * | 2/2010 | Trueb | E04D 13/00 248/544 |
| 2010/0058679 A1 * | 3/2010 | Greaves | E04F 15/02482 52/126.6 |
| 2011/0016809 A1 * | 1/2011 | Knight, III | E04D 11/007 52/263 |
| 2011/0023385 A1 * | 2/2011 | Knight, III | B66F 3/08 52/126.6 |
| 2011/0192941 A1 * | 8/2011 | Lalancette | F16L 3/04 248/70 |
| 2013/0219809 A1 * | 8/2013 | Tabibnia | E04F 15/02464 52/126.6 |
| 2014/0308076 A1 * | 10/2014 | Tabibnia | E01O 5/00 404/99 |
| 2014/0332641 A1 * | 11/2014 | Wilson | F16L 3/2235 248/71 |

FOREIGN PATENT DOCUMENTS

| | | | |
|---|---|---|---|
| CA | 2059575 A1 | 7/1992 | |
| CA | 2070567 A1 | 10/1993 | |
| CA | 2170840 A1 | 9/1996 | |
| CA | 2419381 * | 3/2003 | 25/4 |
| CA | 02419381 * | 3/2003 | E04G 25/04 |
| CA | 2419381 C | 5/2003 | |
| CA | 2410733 C | 12/2003 | |
| CA | 2488946 A1 | 6/2006 | |

* cited by examiner

MULTI-PURPOSE ROOF-TOP SUPPORT

FIELD OF THE INVENTION

The present invention is generally directed toward a system for supporting objects on a roof, or other surface.

BACKGROUND OF THE INVENTION

The roof-tops of commercial and industrial buildings are often used to support items such as pipes, HVAC components, cable trays, electrical conduits, walkways, and drainage systems. The items often need to be elevated above the surface of the roof-top to prevent damage to the roof.

Most commonly, pipes need to be supported above the roof-top. Some of these are for condensate drains for roof-top HVAC systems. Other pipes are used for roof-top drainage, or for steam and liquids, or even as electrical conduits. Because the roofs often have uneven surfaces, the pipes are raised above the roofs and are supported at regular intervals to prevent them from sagging. The supports are especially important at junctions, couplings, and turns because stress at these junctures is more likely to result in a leak.

SUMMARY OF THE INVENTION

Prior to the development of the present invention, roof-top installations required the use of several different types of supports such as boards, strut channel stands, and suspension straps. The present invention provides a support system that is easily adjustable in height and can easily be adapted for many different uses, including supporting pipes, pipe junctions, vertical struts, horizontal struts, and threaded rods. Due to the design, the present invention allows for fast installation, utilizes fewer supports, and reduces the likelihood of roof damage. It can easily be adjusted without tools as part of normal maintenance to accommodate shifts in roofs.

BRIEF DESCRIPTION OF THE DRAWINGS

Further advantages of the invention will become apparent by reference to the detailed description of preferred embodiments when considered in conjunction with the drawings.

DETAILED DESCRIPTION

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications, without departing from the scope of the invention. The present invention is not intended to be limited to the embodiments shown, but is to be accorded the widest possible scope consistent with the principles and features disclosed herein.

Figure 1:
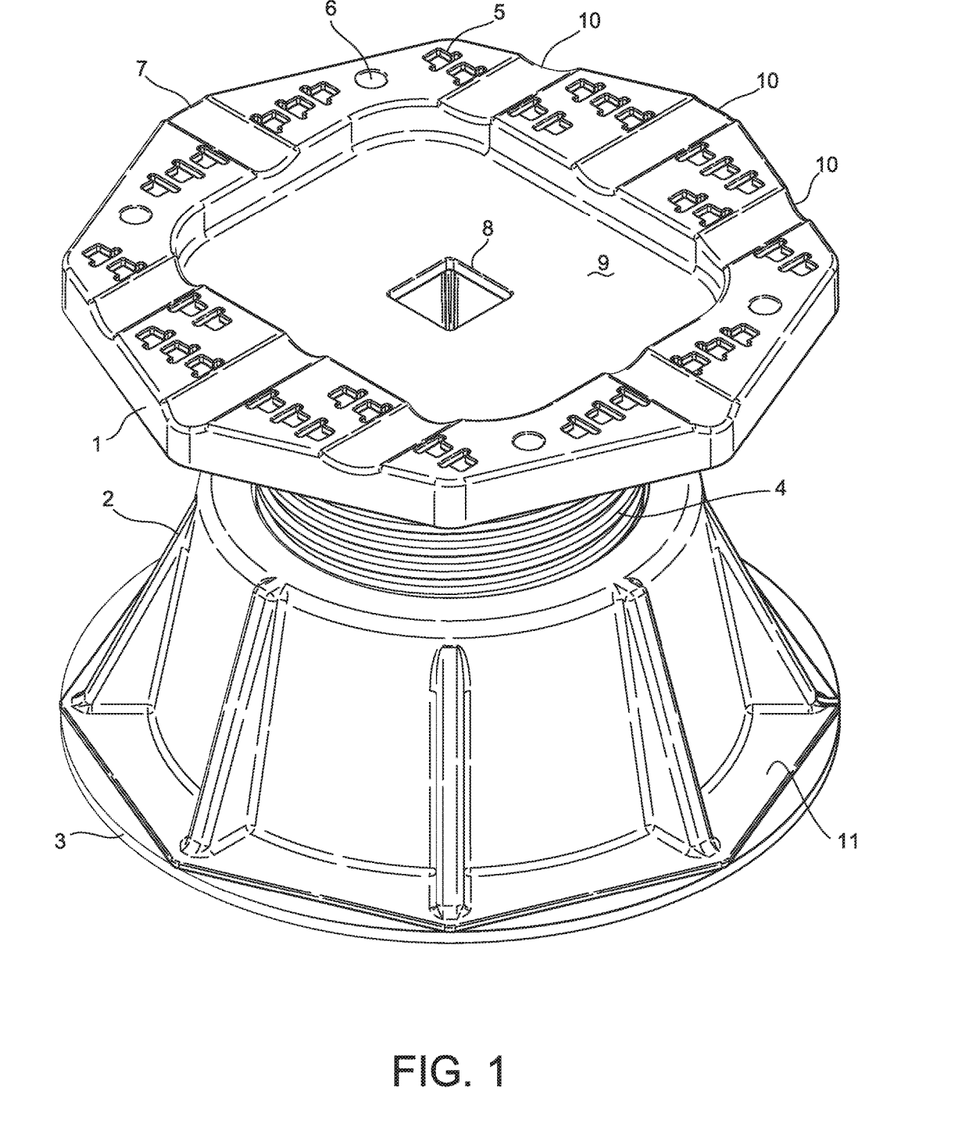
FIG. 1 depicts a perspective view of the multi-purpose roof-top support from above.
Figure 2:
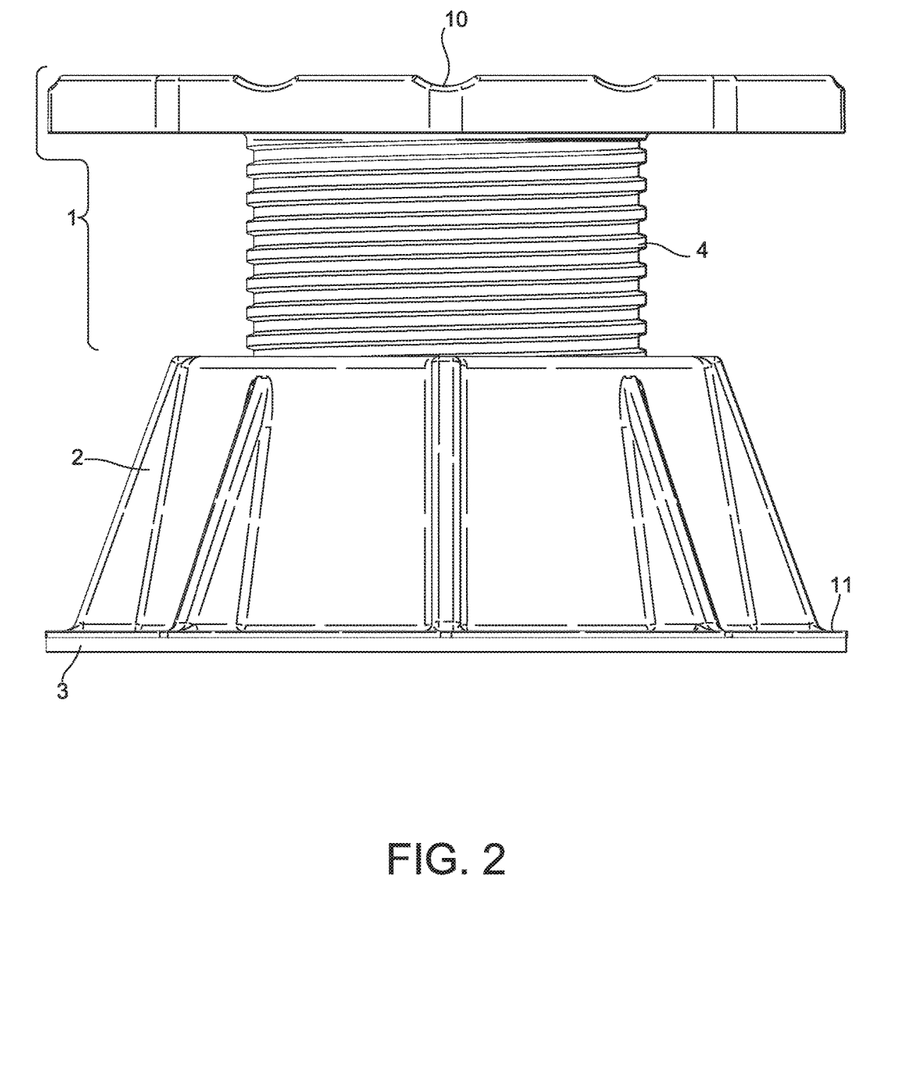
FIG. 2 is a front elevation view of the multi-purpose roof-top support.
Figure 3:
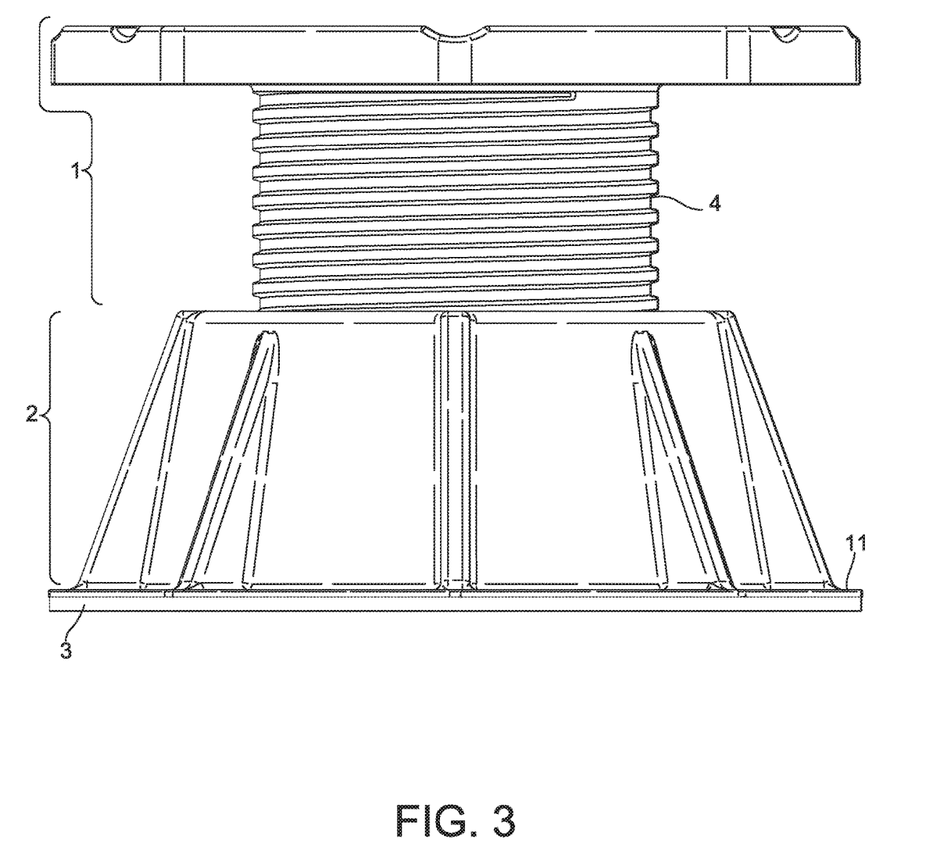
FIG. 3 is a side elevation view of the multi-purpose roof-top support.
Figure 4:
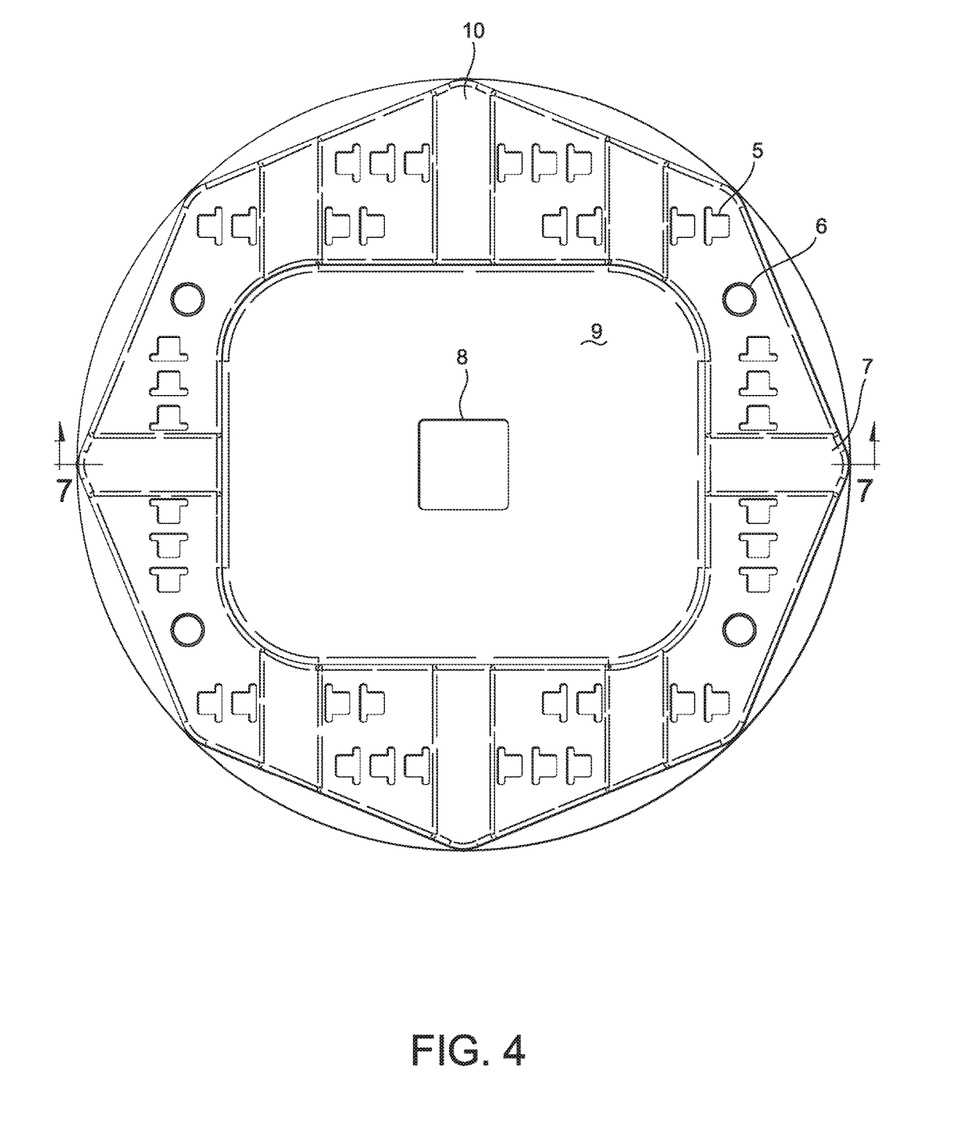
FIG. 4 is top plan view of the multi-purpose roof-top support.
Figure 5:
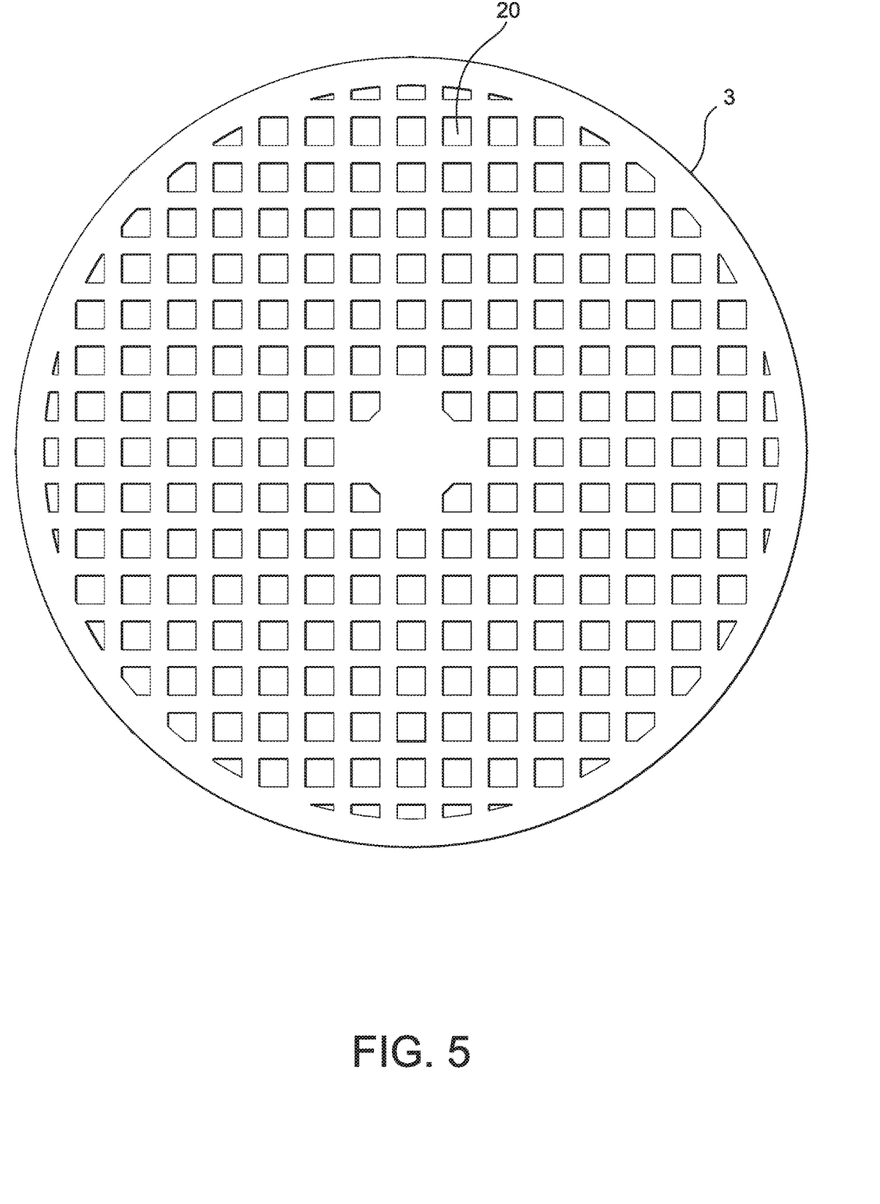
FIG. 5 is a bottom plan view of the base plate 2.
Figure 6:
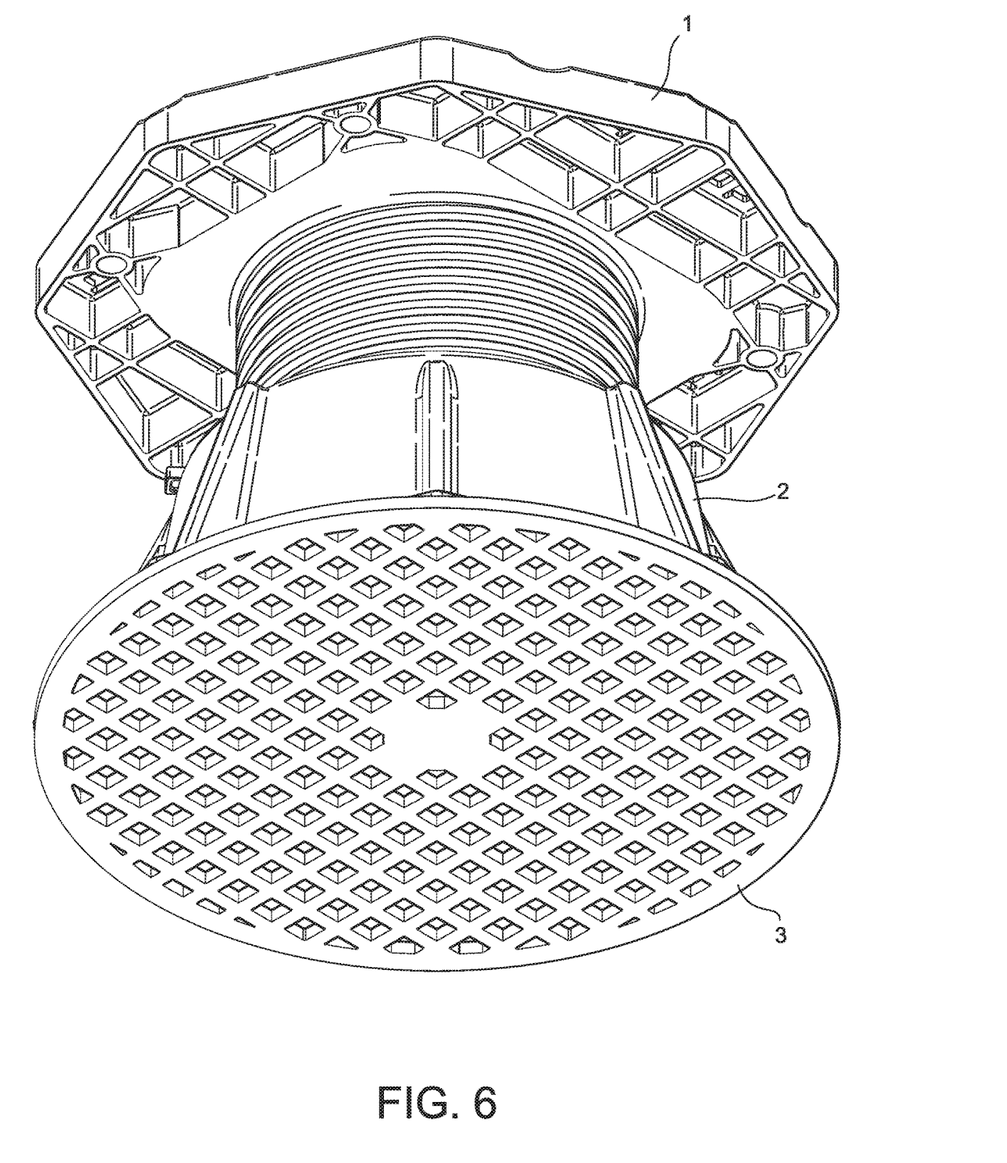
FIG. 6 depicts a perspective view of the multi-purpose roof-top support form above.

As can be seen from FIG. 1, the multi-purpose roof-top support is comprised of two main components: a top plate 1 and a rotating base plate 2. The top plate 1 serves to directly support the objects that are to be raised above the surface of the roof. The top plate 1 includes indentations 7 for pipes or pipe junctions to rest in. Additionally, the top plate 1 includes holes 6 for connecting fasteners and threaded rods 15 and a rectangular opening 8 that allows the support to accept a vertical strut channel 14, such as those manufactured under the SUPERSTRUT or KINDORF strut brand (THOMAS & BETTS CORPORATION).

The top plate 1 has outer threads 4 which engage into the base plate's inner threads 21. The base plate 2, preferably, has a generally conical shape, with a flat perforated plate 11 on the side closest to the roof. The perforations 20 allow rain water to pass through the base plate 2 and also allow small roof-top aggregate to enter the base plate 2, rather than being pushed into the roof and causing damage to the roof membrane.

Preferably, base plate 2 rests upon a mat 3. The mat 3 can be made of any soft material, including an elastomeric material. The mat 3 serves to prevent the base plate 2 from sliding and further helps prevent aggregate from being pushed through the roof. Mat 3 also serves to distribute the vertical load across the bottom of base plate 2.

Installation of this roof-top support is simple. The installer first places the mat 3 directly on the roof, with as little aggregate below it as possible. Base plate 2 will be placed directly on the mat 3. The installer can then place the top plate 1 against the bottom of the object to be supported and lower the top plate 1 onto base plate 2. Base plate 2 is then rotated such that outer threads 4 of top plate 1 engage with inner threads 21 of base plate 2. As the installer continues to rotate base plate 2, the overall height of the support decreases, and the object to be supported is lowered. The installer stops rotating base plate 2 when the desired height is reached.

As mentioned previously, top plate 1 is adaptable to support various objects. Top plate 1 includes wide indentations 7 to support pipes of larger diameter. It also can include narrow indentations 10 to support multiple pipes with narrower diameters. This is advantageous over prior art roof-top supports which can only support a single pipe per support. As will be appreciated from FIG. 10, recessed area 9 allows pipe junctions to easily be supported with a single support device. This, too, is advantageous over prior art support devices that require supports on either side of the junction to protect this most vulnerable part of the pipe. The unique arrangement of the indentations 7 on top plate 1 allows the claimed device to support a 90-degree elbow junction or T-junction with just a single support.

Figure 10:
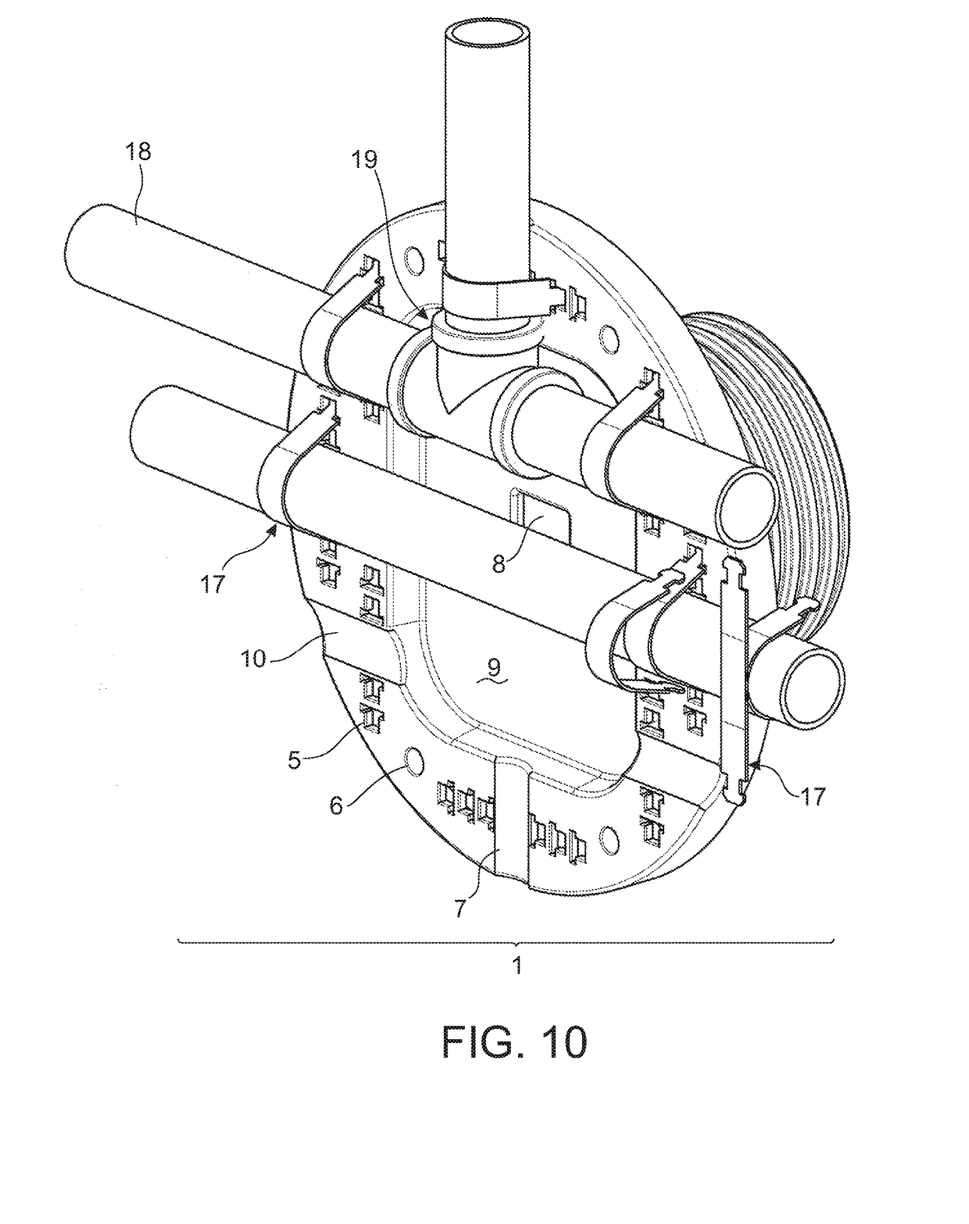
FIG. 10 depicts a perspective view of the top plate of the multi-purpose roof-top support with pipes and T-straps.

The pipes 18, may be secured with flexible T-straps 17, which can be included as part of a kit. The T-straps 17 are narrow strips of flexible, but resilient, material with locking ends such that they will slide into T-slot 5 and spring open, causing their locking ends to be secured in the narrow sections of T-slot 5. The T-straps 17 are removable by squeezing both ends of the T-strap 17 toward the pipe 18 such that they disengage from T-slot 5. In a preferred embodiment, T-strap 17 is made of stainless steel, but any flexible material that will spring back to shape can be used. Alternatively, the pipes 18 may be secured through the use of twisted wire, metal ties, or plastic cable ties (such as those manufactured under the TY-RAP brand) passed through T-slot 5.

Figure 8:
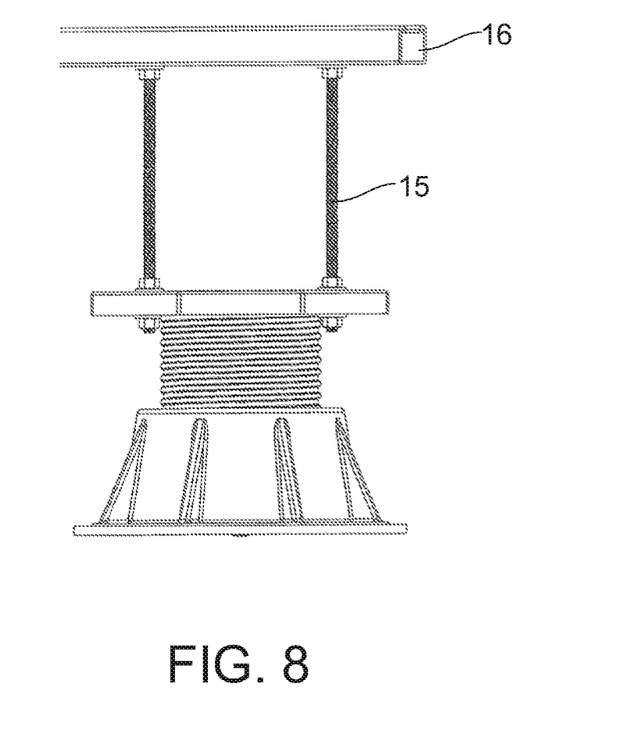
FIG. 8 depicts a multi-purpose roof-top support with threaded rods and a horizontal strut channel attached.
Figure 9A:
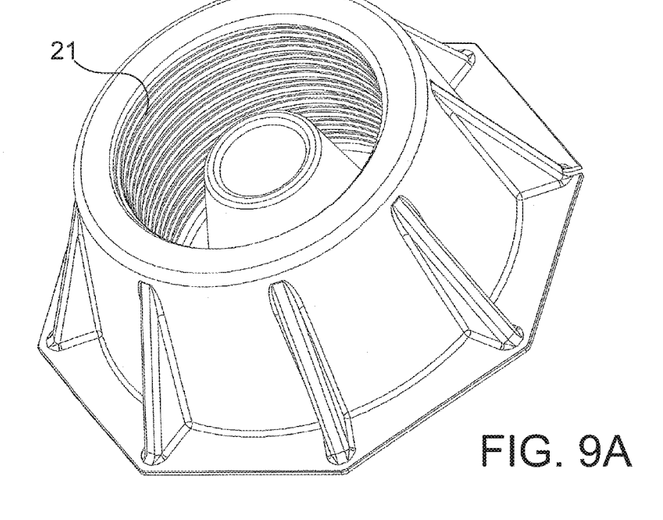
FIGS. 9a and 9b depicts a perspective view from above and below, respectively, of the multi-purpose roof-top support form above.
Figure 9B:
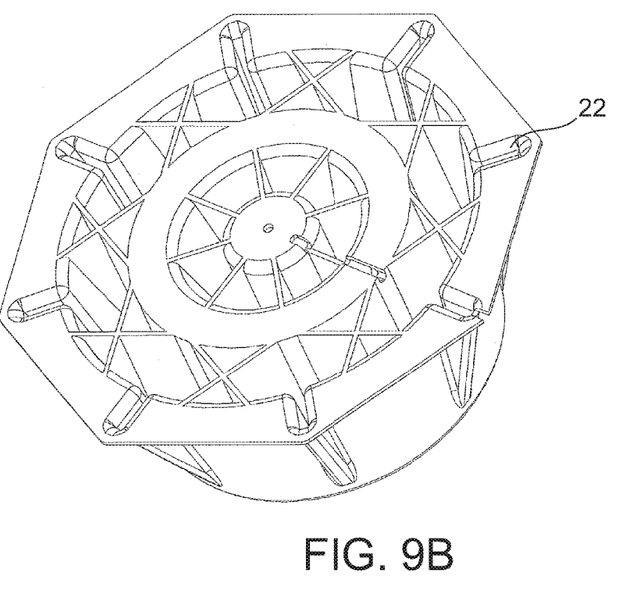

If the support is not tall enough, threaded rods 15 may be attached to top plate 1, as depicted in FIG. 8. The threaded rods 15 pass through holes 6 and can be secured at the bottom of top plate 1 with lock nuts. The threaded rods 15 may be directly attached to the object to be supported, or the object can be connected to horizontal strut channel 16. Holes 6 may also be used directly with nuts and bolts to secure an object directly to top plate 1.

Figure 7:
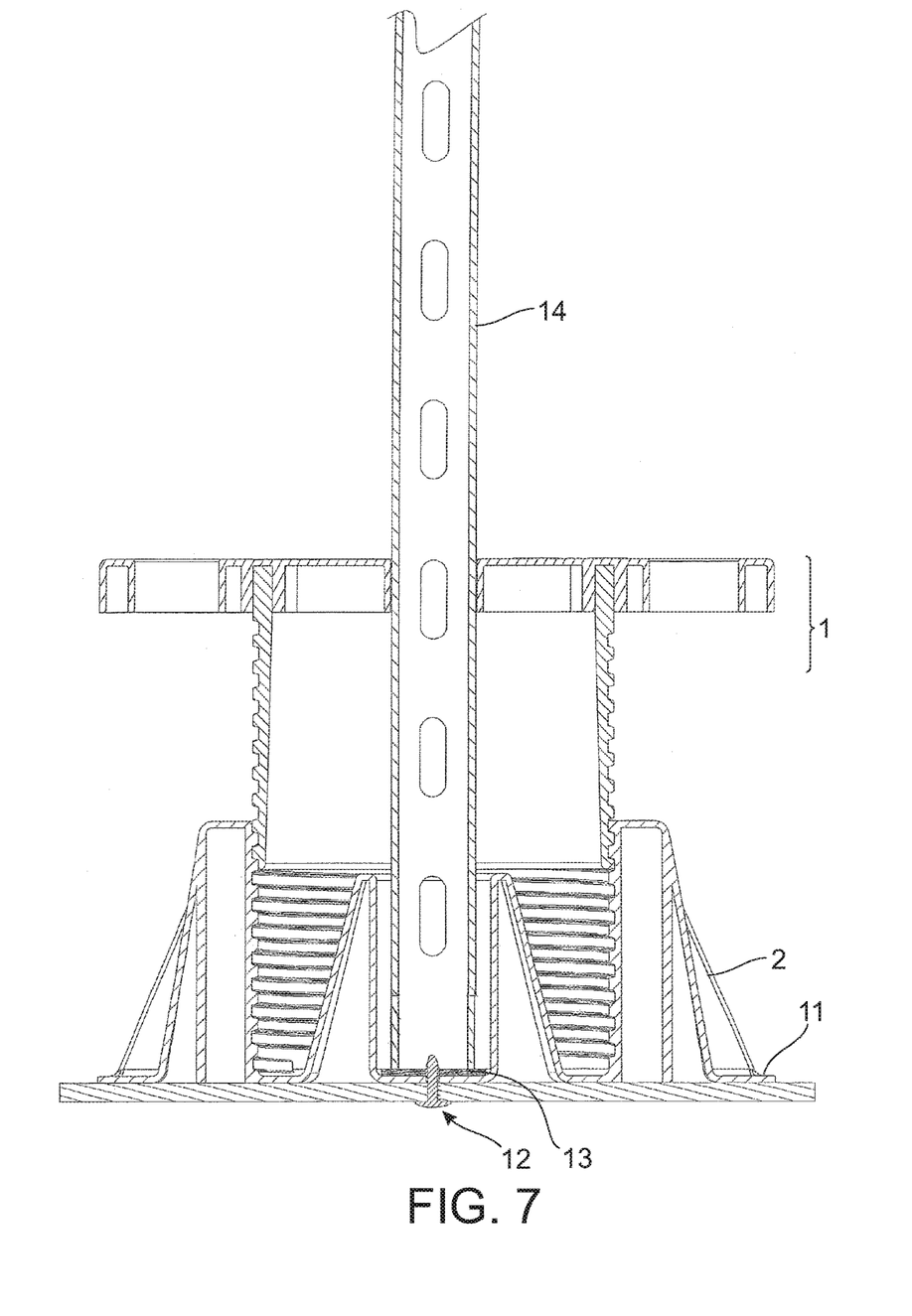
FIG. 7 depicts a cross-section view along line 7-7 of FIG. 4 of the multi-purpose roof-top support with a vertical strut channel installed.

As will be appreciated from FIG. 7, a vertical strut channel 14 can be inserted through rectangular opening 8 in top plate 1. The vertical strut channel 14 can support more weight than threaded rods 15 and allows the roof-top support to be used for supporting heavy objects. The vertical strut channel 14 is received through a central opening in base plate 2 and rests upon a metal washer 13 and metal slug 12. Metal washer 13 allows the downward force of the vertical strut channel 14 and its load to be distributed through the base plate 2.

Figure 11:
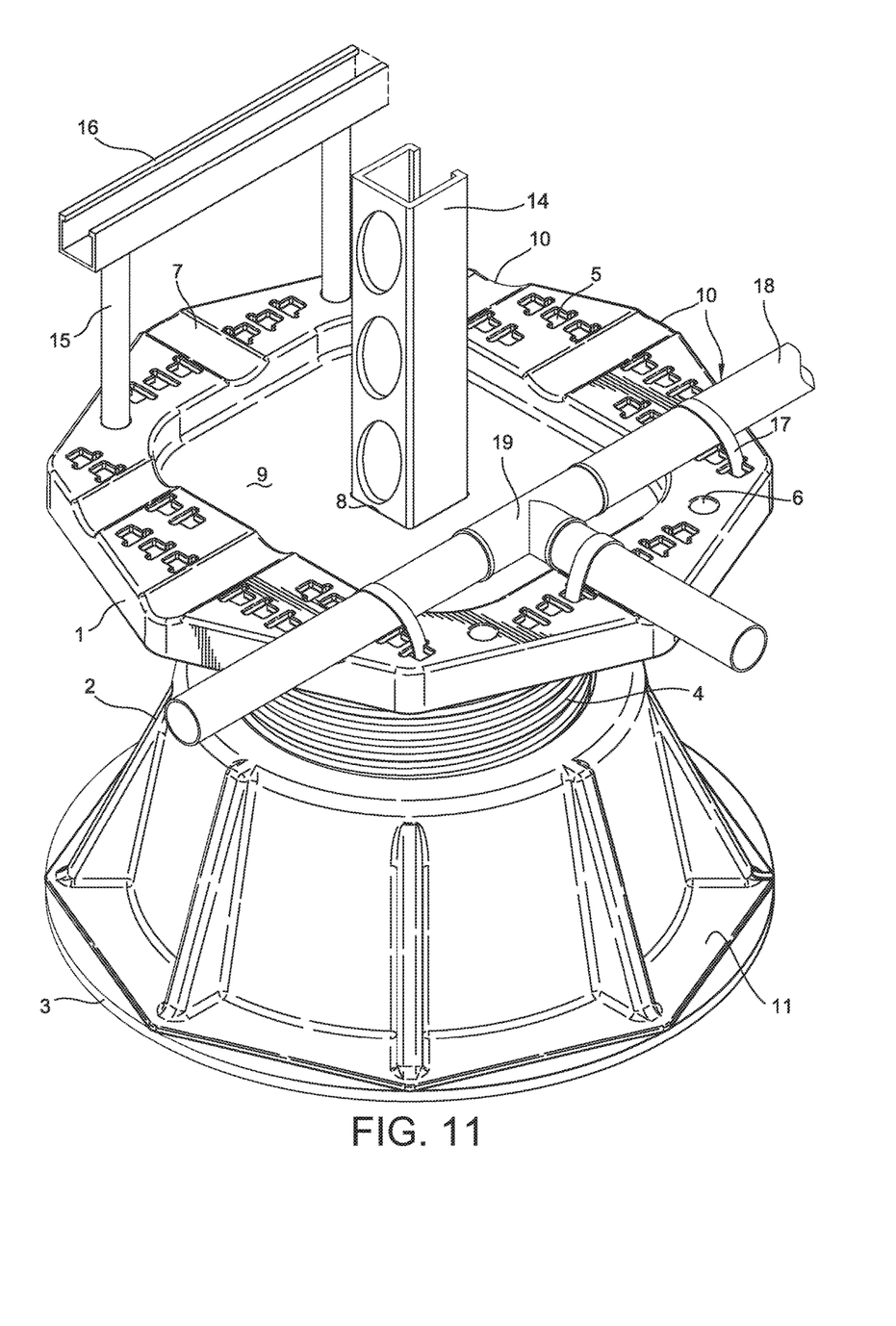
FIG. 11 depicts a perspective view of the top plate of the multi-purpose roof-top support with pipes with a T-junction, threaded rods, a horizontal strut channel, a vertical strut channel, and T-straps.

As can be appreciated from FIG. 11, by simultaneously utilizing the various configurations available on the support system, multiple items can be supported at different heights. For example, a pipe 18, including those with a T-junction 19, can be supported by the indentations 7 and 10, while a horizontal strut channel 16 can be supported at a greater height by threaded rods 15 attached to holes 6 in top plate 1. The vertical strut channel 14 can even be used if rectangular opening 8 is not obstructed.

In a preferred embodiment, the support system is constructed of carbon-loaded polyethylene. This material is strong and withstands extreme hot and cold temperatures and is also UV resistant, a quality not seen in previous supports. Furthermore, base plate 2 has indentations 7 and perforations 20 to allow rainwater to escape, thus preventing damage due to ice. The perforations 20 also allow small aggregate to enter into the base plate 2. This advantage is not appreciated in the prior art supports where aggregate was pushed into the roof, causing damage.

The presently disclosed device allows for fast and simple setup and a larger variety of configuration options that minimize the number of supports required, all while ensuring against roof damage. Because of the versatility, installers do not need to bring a variety of supports to the roof. Once the roof-top support has been installed, maintenance is simple. The base plate 2 is simply rotated to increase or decrease the height of the support. A particularly advantageous feature of the claimed design is that the rotation is accomplished without having to disengage the supported objects from the top plate 1 or the mat 3. Because the base plate 2 pivots upon metal slug 12, base plate 2 can be turned without disturbing the mat 3 or the objects on the top plate 1. As a result, damage to fragile objects that are being supported, such as older pipes, is less likely to occur.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques, other than those specifically described herein, can be applied to the practice of the invention as broadly disclosed herein without resorting to undue experimentation. All art-known functional equivalents of methods, devices, device elements, materials, procedures and techniques described herein are intended to be encompassed by this invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

We claim:

1. A device for supporting objects comprising:
    an upper platform having a plurality of indentations in its upper surface, said plurality of indentations forming a plurality of grooves, with each groove of said plurality of grooves having a sufficient depth from a plane of said upper surface to support a pipe resting horizontally, a slot in said upper platform configured to interlock with a strap for securing said pipe to said upper platform, and a recessed area in said upper surface of said upper platform, said recessed area having a depth greater than said plurality of grooves and an area sufficient to accommodate one or more pipe junctions, and said recessed area having an opening capable of receiving a vertical strut channel, wherein each of said plurality of grooves extends horizontally from an edge of said upper platform to an edge of said recessed area and wherein said plurality of grooves are disposed such that a first plurality of matched grooves are positioned parallel to one another and a second plurality of matched grooves are positioned perpendicular to said first plurality of matched grooves; and
    a lower base threadably coupled to said upper platform such that said upper platform can be raised or lowered relative to said lower base by rotating said lower base and said lower base further includes a central opening disposed on a bottom surface of said lower base below said opening and configured to receive said vertical strut channel that said vertical strut channel passes through both said central opening and said opening.

2. The device of claim 1 further comprising a metal slug at the center of the bottom surface of said lower base about which said lower base can rotate and which supports said vertical strut channel.

3. The device of claim 1 wherein the bottom surface of said lower base is perforated to allow aggregate to enter.

4. The device of claim 1 wherein said upper platform has a hole for receiving a threaded rod or bolt.

5. The device of claim 1 wherein said upper platform is configured to support objects at various heights above said upper platform through a plurality of threaded rods or additional strut channels.

6. The device of claim 1 wherein said opening capable of receiving said vertical strut channel is rectangular.

7. A device for supporting an object comprising an upper platform and a lower base, wherein said upper platform comprises:
a first plurality of indentations forming a first set of horizontal grooves in an upper surface of said upper platform, wherein said first set of horizontal grooves are disposed parallel to one another, a second plurality of indentations forming a second set of horizontal grooves in said upper surface, wherein said second set of horizontal grooves are disposed perpendicular to said first set of horizontal grooves, a recessed area having a depth greater than said first and second sets of horizontal grooves and having an area sufficient to accommodate a pipe junction of pipes substantially within said recessed area, a vertical strut channel, a bolt, and a threaded rod, wherein said bolt and said threaded rod are received through said upper surface, and wherein said vertical strut channel is received through an opening in said recessed area in said upper surface, said vertical strut channel passes through a central opening in said lower base, said first set and said second set of horizontal grooves extend from an edge of said upper platform to an edge of said recessed area and have a sufficient depth from a plane of said upper surface to support a pipe resting horizontally, a slot in said upper platform configured to interlock with a strap for securing said pipe to said upper platform, and said upper platform is threadably-coupled to said lower base such that said upper platform can be raised by rotating said lower base relative to said upper platform without detaching said object from said upper platform or without lifting lower base above the surface upon which it rests.

8. The device of claim 7 wherein said pipe junction is a 90-degree elbow.

9. The device of claim 7 wherein said pipe junction is a T-junction.

10. The device of claim 7 wherein said lower base is perforated to avow aggregate to enter through a bottom of said base.

11. The device of claim 7 further comprising a pivot point located in a center of said lower base allowing said lower base to rotate about said pivot point.

12. The device of claim 7 wherein said strut channel is oriented vertically.

13. A kit for supporting pipes on a roof-top comprising:
(i) an upper platform and a lower base, wherein said upper platform comprises a first plurality of indentations forming a first set of horizontal grooves in an upper surface of said upper platform, wherein said first set of horizontal grooves are disposed parallel to one another, a second plurality of indentations forming a second set of horizontal grooves in said upper surface, a recessed area centrally disposed on said upper surface, wherein said second set of horizontal grooves are disposed perpendicular to said first set of horizontal grooves, wherein said first set and said second set of horizontal grooves extend from an edge of said upper platform to an edge of said recessed area and have a sufficient depth from a plane of said upper surface to support a pipe resting horizontally, wherein said recessed area has a depth greater than said first set and said second set of horizontal grooves and an area sufficient to accommodate a pipe junction of said pipes substantially within said recessed area, a vertical strut channel, a bolt, and a threaded rod, wherein said vertical strut channel, said bolt, and said threaded rod are received through said upper surface, wherein said upper platform is coupled to said lower base allowing said upper platform to be raised or lowered relative to said lower base, and wherein said upper platform and said lower base each including an opening through which said vertical strut channel can be inserted, wherein said lower base opening includes a slug and a washer and is disposed on a bottom surface of said lower base below said upper platform opening; and
(ii) a plurality of straps for securing said pipes to said upper platform.

14. The kit of claim 13 wherein said threaded rod fits into a hole in said upper platform.

\* \* \* \* \*